United States Patent [19]  
Ulm

[11] 3,858,857  
[45] Jan. 7, 1975

[54] FEED CONTROL MECHANISM  
[75] Inventor: Ernest S. Ulm, Stow, Ohio  
[73] Assignee: Monsanto Company, St. Louis, Mo.  
[22] Filed: May 29, 1973  
[21] Appl. No.: 364,819

[52] U.S. Cl. ............... 259/191, 226/39, 259/26, 425/145  
[51] Int. Cl. ............................................. B29f 3/02  
[58] Field of Search ........... 259/191, 192, 193, 185, 259/9, 10, 25, 26, 5, 6, 7, 21, 22, 23; 198/35; 226/39, 38; 425/145, 147, 148

[56] References Cited  
UNITED STATES PATENTS  
3,360,822  1/1968  Schippers ..................... 259/191  
3,447,201  6/1969  Seanor .......................... 259/191  
3,558,026  1/1971  Rosen ............................ 226/39  
3,728,056  4/1973  Theysohn ...................... 425/145  
3,782,700  1/1974  Wittrock ....................... 259/192

Primary Examiner—Robert W. Jenkins

[57] ABSTRACT

A mechanical feed control for a device having a rotating member for working material in shear is described which controls the feed rate of incoming material in response to accumulation of material above the rotating member.

5 Claims, 5 Drawing Figures

FEED CONTROL MECHANISM

This invention relates to a system for subjecting material to shearing forces under controlled feed conditions. It particularly relates to a mechanical feeding mechanism to control the rate at which a material is fed to a rotating member of a device for working the material in shear, especially to the screw of an extruder for elastomeric material.

BACKGROUND OF THE INVENTION

In extruding thermoplastic material such as rubber and other elastomers it is usually desired to feed the extruder continuously for which purpose the feed material is a continuous rubber strip of suitable width and thickness but the rate at which the extruder screw takes up the material must be kept in balance with the rate of feeding the strip. A rubber extruder usually contains a feed roll adjacent to the extruder screw which rotates in a direction opposite to that of the screw so that material fed in the direction of rotation is drawn into the nip between the feed roll and screw. However, back pressure builds up due to feed rate, extruder speed, die configuration, feed stock, variations in rate of feed or speed of rotating the extruder screw and other causes so that material accumulates in the nip at the area of material contact with the screw and constant attention by an operator is required. Moreover, material accumulated in the nip may become detached from the main body of material and the operator may have to force the detached material into contact with the screw. Complex electro-mechanical devices have been used to control the flow of material to an extruder in response to buildup of material in the nip but the present invention provides a simple mechanical device for that purpose.

SUMMARY OF THE INVENTION

The improved feed control mechanism comprises pressure exerting means to exert pressure on incoming material being fed to a device having a rotating member to work the material in shear, in combination with pressure receiving or sensing means disposed to sense pressure from accumulation at the rotating member of material being fed and pressure transfer means to transfer pressure to the pressure exerting means in response to the pressure sensed.

The structure comprises a generally U-shaped mounting bracket to which is pivotally connected pressure sensing means together with first and second elements of pressure exerting means, the first element being pivotally movable in response to the pressure sensed, and the second element being provided with means to maintain it in substantially fixed relationship to the mounting bracket whereby accumulation of feed material above a predetermined height causes the pressure to increase on the incoming material and slow the rate of feed. The pressure exerting means may be a first roll acting against a planar surface or drag plate between which the strip of incoming material is squeezed in response to buildup of material in the nip. The pressure sensing means may be a second roll or preferably a bar disposed above the nip of the rotating member. Both the pressure sensing means and an element of the pressure exerting means are mounted on the same pivotal assembly. It is advantageous to provide means for adjusting the position of the drag plate and to provide means allowing some motion of the drag plate under operating conditions, for example by allowing it to act against spring pressure in order to soften or control the braking action because some stocks readily break or freeze under the influence of suddenly increased pressure. Because the pinching between the drag plate and first roll is, within limits, proportional to the accumulation of material above the nip, automatic control of the feed is achieved thereby eliminating the need for constant attention by an operator.

DESCRIPTION OF PREFERRED EMBODIMENTS

Figure 1:
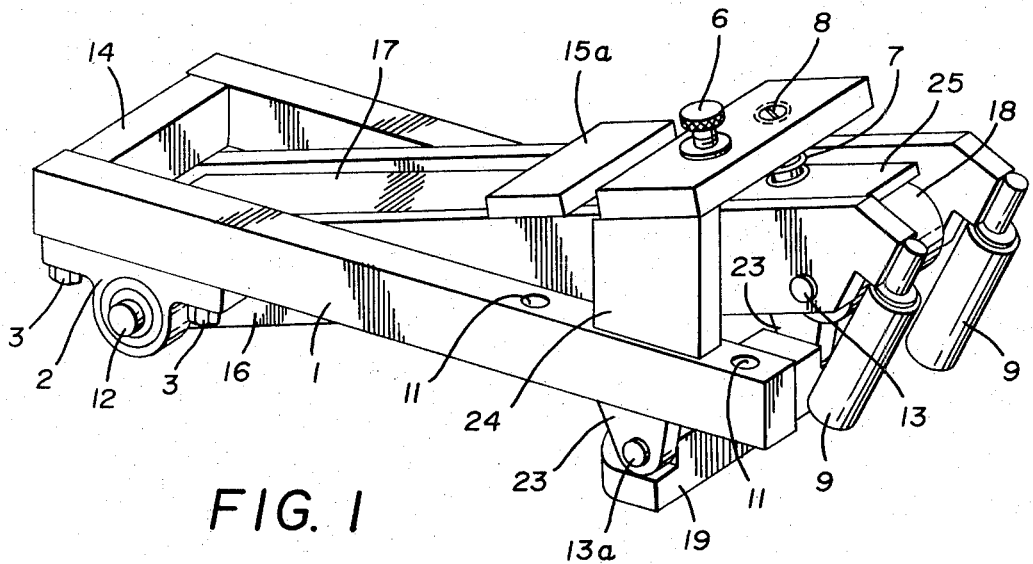
FIG. 1 is a perspective view of an embodiment of the feed control mechanism.
Figure 2:
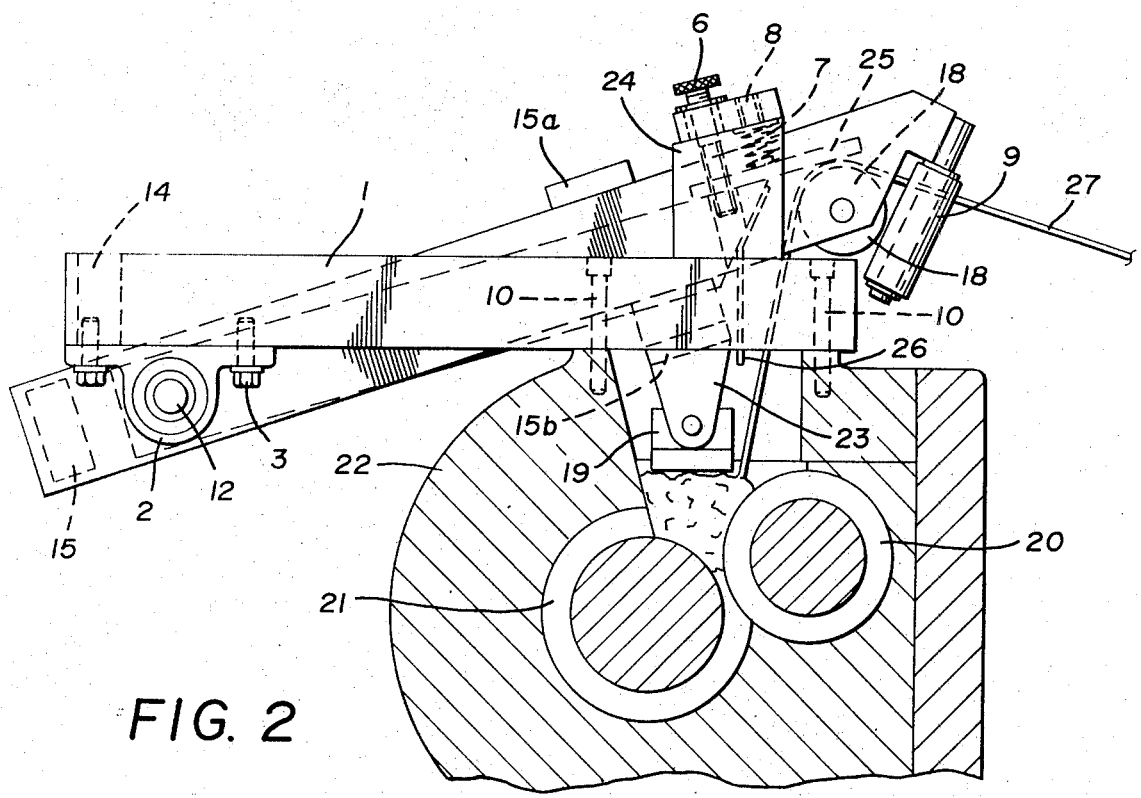
FIG. 2 is a view of a system for extruding material under controlled feed conditions showing a cross section of the extruder and a side view of the feed mechanism.
Figure 3:
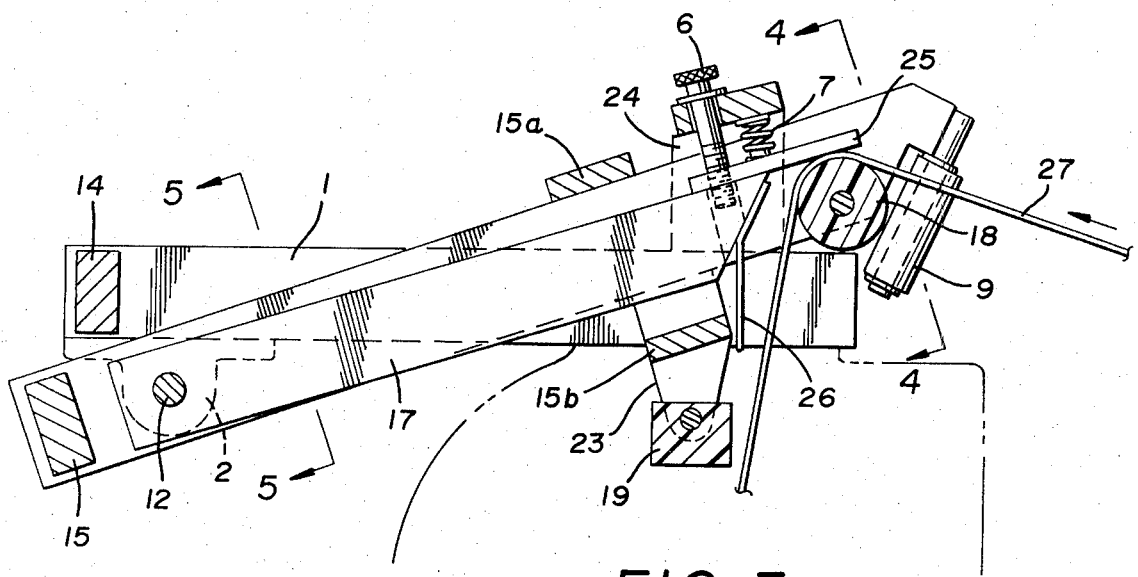
FIG. 3 is a simplified view of FIG. 2 to show the location of the cross-sectional views illustrated by FIGS. 4 and 5.

The feed control mechanism shown in FIG. 1 comprises a bracket generally indicated as 1 which includes two side bars, each of which is provided with holes 11 for mounting screws to fasten the mechanism to the device with which it is to be used. Thus, in operation, bracket 1 is stationary. The aforesaid side bars are attached, as be welding, to crossbar 14 at the rear and to members of bridge structure 24 at the front. Shaft 12 extends through bearing blocks 2 affixed to each side of the stationary bracket 1 by screws 3 and through side bars 16 attached to rear crossbar 15 (FIG. 2) and top crossbar 15a of a pivotal bracket indicated generally as 16. Pivotal bracket 16 which pivots on shaft 12 is part of a pivotal bracket assembly which includes both drag roll 18 on shaft 13 and pressure sensing element 19. Drag roll 18 rotates on shaft 13 supported by the side bars of the pivotal bracket. Pressure sensing element 19, which may be a block of nylon, is rigidly fixed on stationary shaft 13a through arms 23 attached to each side of the pivotal bracket 16 and to crossbar 15b (FIG. 2). A pressure sensing rotatable roll may replace the pressure sensing bar.

Shaft 12 also passes through the rear of brake plate 17 which is pivotally mounted on shaft 12. The brake plate comprises a heavy flat steel bar disposed between the side bars of the pivotal bracket and a thinner bar or drag plate 25 secured thereto, the latter being disposed above drag roll 18. The upward motion of the brake plate 17 is limited within the confines of a bridge structure, indicated generally as 24, comprising a top framing member joined to two side pieces which are in turn welded or otherwise joined to the side pieces of stationary bracket 1. Screw 6, in the top of the aforesaid bridge structure floats in the bridge structure but screws into the brake plate to adjust the height of the brake plate above drag roll 18 and as a secondary effect, control the height at which the pressure sensing element 19 is subjected to pressure. Pressure exerted on brake plate 17 works against the pressure of spring 7, the spring tension being adjustable by screw 8 (FIG. 2). Guide rolls 9 mounted on shafts extending from the pivotal bracket are disposed in front of drag roll 18 and brake plate 17.

A system for extruding plastic material under controlled feed conditions and its operation are illustrated by FIG. 2 which shows a preferred embodiment comprising the feed mechanism of FIG. 1 affixed by mounting screws 10 to housing 22 of an extruder provided with a feed roll 20 adjacent to a screw 21. An incoming strip of material 27 passes between guide rolls 9 which keep the incoming material in proper alignment over drag roll 18. The heavy bar of the brake plate is cut at an angle to facilitate starting a strip of feed to the extruder and to it is fastened a strip of sheet metal 26 further to guide the strip to the feed roll 20 to start the feed.

Accumulation of material in the nip between the extruder screw 21 and feed roll 20 tends to raise sensing element 19 and with it the entire pivotal assembly which includes drag roll 18. The lower position of the pivotal assembly is unimportant except that the pressure sensing element 19 should not be able to drop so low as to interfere with the extruder mechanism. In the arrangement illustrated, the side bars of the pivotal assembly, which include the pressure sensing element 19, rest on the rim of the extruder feed port when subjected to no upward force. In the lowest position, the distance between the pressure sensing element 19 and the rotating members 20 and 21 of the extruder is determined by the length of arms 23. When material buildup in the nip raises pressure sensing element 19 and with it drag roll 18 sufficiently to press the incoming strip against plate 25, further rise of pressure sensing element 19 is opposed by drag plate 25. Any continued accumulation of material increases the pressure on the pressure sensing element 19 which increase is transmitted to drag roll 18. Accordingly, drag roll 18 pinches the incoming strip of material 27 against the drag plate 25 of the brake plate in proportion to the pressure exerted on 19. The friction between the incoming strip and the drag plate slows the strip and prevents further buildup in the nip. The strip flow is automatically modulated with changes of screw speed, die configuration and feed stock. As explained, some stocks break rather easily when subjected to pressure, and accordingly, spring back-up on the drag plate is desirably provided to limit the pinch load and allow sufficient slippage to prevent breaking the feed strip.

Figure 4:
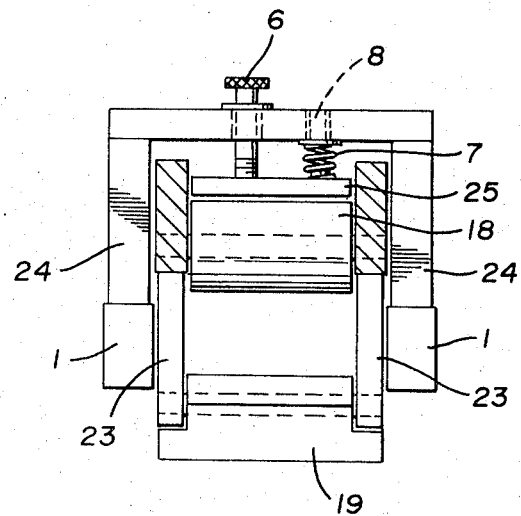
FIG. 4 is a cross section through 4—4 of FIG. 3 at the front of the feed mechanism illustrating the pressure exerting elements through which incoming material is fed.
Figure 5:
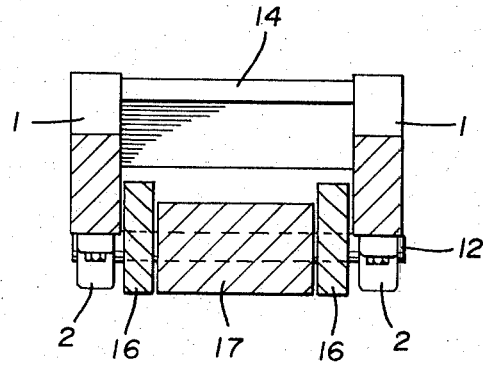
FIG. 5 is a cross section through 5—5 of FIG. 3 at the rear of the feed mechanism illustrating the pivotal mounting of the assembled elements.

As seen from the cross sectioned view of the front of the feed mechanism shown in FIG. 4, pressure exerted on the pressure sensing element 19 is transmitted to drag roll 18 tending to narrow the gap between it and drag plate 25 of the brake plate because both the pressure sensing element 19 and drag roll are part of the same pivotal assembly. The pivot point, most clearly seen in FIG. 5, is shaft 12 in bearing block 2 secured to stationary bracket 1 on which shaft the pivotal assembly is rotatably mounted through side bars of the pivotal bracket 16. Brake plate 17 is also pivotable on shaft 12 as previously explained.

Although the invention has been illustrated by typical examples, it is not limited thereto. Typically, sensing element 19 can be a roll and roll 18 can be a slide. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. Feed control mechanism for plastic material which comprises pressure exerting means to exert pressure on an incoming strip of material, pressure sensing means disposed to be subjected to pressure from buildup of material and pressure transfer means to transfer pressure to said pressure exerting means in response to the pressure sensed.

2. Feed control mechanism for plastic material which comprises supporting bracket, pressure sensing means on a pivotal assembly supported by the bracket and disposed to be subjected to pressure from buildup of material, pressure exerting means comprising first and second elements to exert pressure on an incoming strip of material in response to the pressure sensing means, the first element of the pressure exerting means being on the same pivotal assembly as the pressure sensing means and the second element being independently pivotally connected to the supporting bracket, and means to maintain said second element in substantially fixed relationship to the supporting bracket.

3. The mechanism of claim 2 in which the first and second elements of the pressure exerting means are a roll and planar surface, the roll acting against the planar surface through the incoming strip of material and the pressure sensing means is a rigid bar.

4. System for subjecting a material to shearing forces under controlled feed conditions comprising at least one rotating member for imposing shearing force on the material, pressure sensing means disposable above the area of material contact with the rotating member, pressure transfer means for transferring pressure sensed from accumulation of material above said area of material contact to pressure exerting means, and pressure exerting means for exerting pressure on an incoming strip of material in response to the pressure sensed.

5. System of claim 4 in which the rotating member is the screw of an extruder, the pressure sensing means is a member of a pivotal assembly of which a first element of the pressure exerting means is a member, said assembly being pivotally attached to a stationary bracket secured to the extruder and means are provided to maintain a second element of the pressure exerting means in substantially fixed relationship to the stationary bracket.

* * * * *